(12) United States Patent
Peng et al.

(10) Patent No.: US 12,352,693 B2
(45) Date of Patent: Jul. 8, 2025

(54) METHOD FOR QUALITATIVE IDENTIFICATION AND QUANTITATIVE DETERMINATION OF CAFFEINE IN DRUG

(71) Applicants: University of Shanghai for Science and Technology, Shanghai (CN); CHONGQING INSTITUTE FOR FOOD AND DRUG CONTROL, Chongqing (CN)

(72) Inventors: Yan Peng, Shanghai (CN); Linggao Zeng, Chongqing (CN); Yiming Zhu, Shanghai (CN); Qingrou Yang, Shanghai (CN); Chenjun Shi, Shanghai (CN); Xu Wu, Shanghai (CN); Songlin Zhuang, Shanghai (CN)

(73) Assignees: University of Shanghai for Science and Technology, Shanghai (CN); CHONGQING INSTITUTE FOR FOOD AND DRUG CONTROL, Chongqing (CN)

( * ) Notice: Subject to any disclaimer, the term of this patent is extended or adjusted under 35 U.S.C. 154(b) by 965 days.

(21) Appl. No.: 17/321,413

(22) Filed: Aug. 27, 2021

(65) Prior Publication Data
US 2021/0381963 A1 Dec. 9, 2021

(30) Foreign Application Priority Data
Sep. 27, 2020 (CN) .......................... 202011030657.4

(51) Int. Cl.
*G01N 21/35* (2014.01)
*G01N 21/3581* (2014.01)

(52) U.S. Cl.
CPC . *G01N 21/3581* (2013.01); *G01N 2021/3595* (2013.01)

(58) Field of Classification Search
CPC .................. G01N 21/3581; G01N 2021/3595
See application file for complete search history.

(56) References Cited

FOREIGN PATENT DOCUMENTS

| CN | 106525809 A | 3/2017 |
|---|---|---|
| CN | 108226366 A | 6/2018 |

*Primary Examiner* — Hugh Maupin

(57) ABSTRACT

A method for qualitative identification and quantitative determination of caffeine in a drug. In the method, terahertz absorption coefficient spectra of drugs with different concentrations of caffeine are measured, from which the frequency points, amplitudes and peak areas of characteristic peaks of the drugs with different concentrations of caffeine are obtained as characteristic quantities. Concentration gradients are established between the concentrations and the characteristic quantities, respectively. The characteristic quantities are imported to the SVR model to establish a training set and a test set. Finally, the qualitative identification and quantitative analysis of caffeine in unknown drugs are achieved.

1 Claim, 4 Drawing Sheets

METHOD FOR QUALITATIVE IDENTIFICATION AND QUANTITATIVE DETERMINATION OF CAFFEINE IN DRUG

CROSS-REFERENCE TO RELATED APPLICATIONS

This application claims the benefit of priority from Chinese Patent Application No. 202011030657.4, filed on Sep. 27, 2020. The content of the aforementioned application, including any intervening amendments thereto, is incorporated herein by reference in its entirety.

TECHNICAL FIELD

This application relates to an application of a terahertz spectrum, and more particularly to a method for qualitative identification and quantitative determination of caffeine in a drug.

BACKGROUND

Caffeine is a central nervous system stimulant which can stimulate secretion of adrenaline, thereby causing rapid heartbeat and increased blood pressure. In addition, the caffeine is a second-class psychotropic drug controlled by the state, whose usage and dosage must strictly abide by the national and medical regulations. The current methods comprise thin layer chromatography, ultraviolet spectrophotometry and high performance liquid chromatography for determining caffeine in drugs. However, these analysis methods have problems of strict pretreatment conditions, complex analysis processes, long time and high analysis cost. Terahertz waves are electromagnetic waves with a frequency in a range from 0.1 THz to 10 THz and have wave band between microwave and infrared, which have rich scientific significance and broad application prospects. The terahertz photons have energy with only milli-electron volts, which will not damage the measured substances due to ionization. Therefore, most polar molecules can resonate and absorb the energy in the terahertz band, so that the spectra of the polar molecules can be detected. Compared to these traditional chemical methods, terahertz spectroscopy provides a new and effective way for the non-destructive detection and identification of the substances.

A terahertz spectrum has the same characteristics as a fingerprint spectrum, which means that the different chemical composition of the substance corresponds to the location of characteristic peaks in the spectrum. Therefore, the terahertz spectrum can be configured to identify types of the substance. In addition, amplitude and a peak area of a same absorption peak in the terahertz spectra of the same substance at different concentrations will also show different rate of change, so as to determine the concentration of the substance.

SUMMARY

An object of this application is to provide a method for qualitative identification and quantitative determination of caffeine in a drug to solve problems of long time and high cost for the determination of the caffeine in the drug in prior art, which improves test efficiency and reduces costs.

This application provides a method for qualitative identification and quantitative determination of caffeine in a drug, comprising:

(1) selecting n reference samples with different concentrations of caffeine; and scanning each of the n reference samples with a Fourier transform infrared spectrometer (FTIR) to obtain a terahertz absorption coefficient spectrum of each of the n reference samples;

(2) extracting frequency points, amplitudes and peak areas of at least one of characteristic peak of each of the concentrations of caffeine from the corresponding terahertz absorption coefficient spectrum obtained by step 1; and establishing concentration gradients between the concentrations and three characteristic quantities, respectively, wherein the three characteristic quantities are the frequency points, amplitudes and peak areas;

(3) grouping the frequency points, amplitudes and peak areas obtained by step 2 as characteristic vectors into two groups, wherein one group is used as training data, and another group is used as test data; and using the training data to establish training of a support vector regression (SVR) model to find out characteristic relationship between the concentrations of the caffeine and the characteristic vectors of the terahertz absorption coefficient spectra, thereby obtaining a trained SVR model; and (4) scanning an analyte with the FTIR to obtain the terahertz absorption coefficient spectrum of the analyte, from which the frequency points, amplitudes and peak areas of the analyte are obtained; importing the frequency points, amplitudes and peak areas into the trained SVR model obtained by step 3; and performing a mathematical calculation to qualitatively identify and quantitatively determine the caffeine in the analyte;

wherein the characteristic peak is one or more of the characteristic peaks in the terahertz absorption coefficient spectrum of the caffeine.

Compared to the prior art, this disclosure has the following beneficial effects.

In the method provided herein, terahertz absorption coefficient spectra of drugs with different concentrations of caffeine are measured, from which frequency points, amplitudes and peak areas of characteristic peaks of the drugs with different concentrations of caffeine are obtained as characteristic quantities. Concentration gradients are established between the concentrations and the characteristic quantities, respectively. The characteristic quantities are imported to the SVR model to establish a training set and a test set. Finally, the qualitative identification and quantitative analysis of caffeine in unknown drugs are achieved. The method does not need to determine initial spectra of pure products corresponding to all ingredients in the drug. At the same time, the method is not limited to the number of the ingredients and a ratio of the ingredients in a previous test. However, the method only needs to introduce the terahertz absorption coefficient spectroscopic data of an analyte into an algorithm model to immediately obtain results. Compared to common methods, the method provided herein is more convenient and efficient, and solves problems of long time and high cost for the determination of the caffeine in the drug when a large amount of substances in the drug are mixed.

DETAILED DESCRIPTION OF EMBODIMENTS

The present disclosure will be further described in detail with reference to the embodiments and the accompanying drawings, from which technological means, features, objectives and effects of the present disclosure will be better understood.

Embodiment

A method for qualitative identification and quantitative determination of caffeine in a drug is described in detail in this embodiment.

Compound paracetamol used herein is self-made by Chongqing Food and Drug Inspection and Testing Research Institute, and caffeine content is tested by a high performance liquid chromatograph.

In this embodiment, a Fourier transform infrared spectrometer (FTIR) has an effective frequency from 0.1 THz to 20 THz, a computer is provided with a libsvm toolkit and the compound paracetamol samples is taken as an example to describe the method in detail. The compound paracetamol includes acetaminophen, aspirin or propyphenazone and caffeine and other excipients. Direct detection of the compound paracetamol causes a problem of excessive absorption. Therefore, the compound paracetamol is ground into powders and mixed with cycloolefin copolymer (COC) base material in a certain ratio before testing. The COC is chosen as the base material because the COC has high transmittance in the terahertz band and does not interfere with the measurement of the characteristic spectrum data of the samples. In addition, the COC is used as a sample diluent to ensure the best concentration value of the samples and at the same time, the COC is used as a binder to ensure the samples is pressured into an unbreakable tablet with uniform thickness. The base material can also be replaced with other materials with high transmittance in the terahertz band. Each piece of samples is made of 60 mg of COC and the compound paracetamol with different qualities, where a diameter is 13 mm and a thickness is 0.55±0.02 mm. A total of 35 samples with different concentrations of caffeine are prepared.

Figure 1:
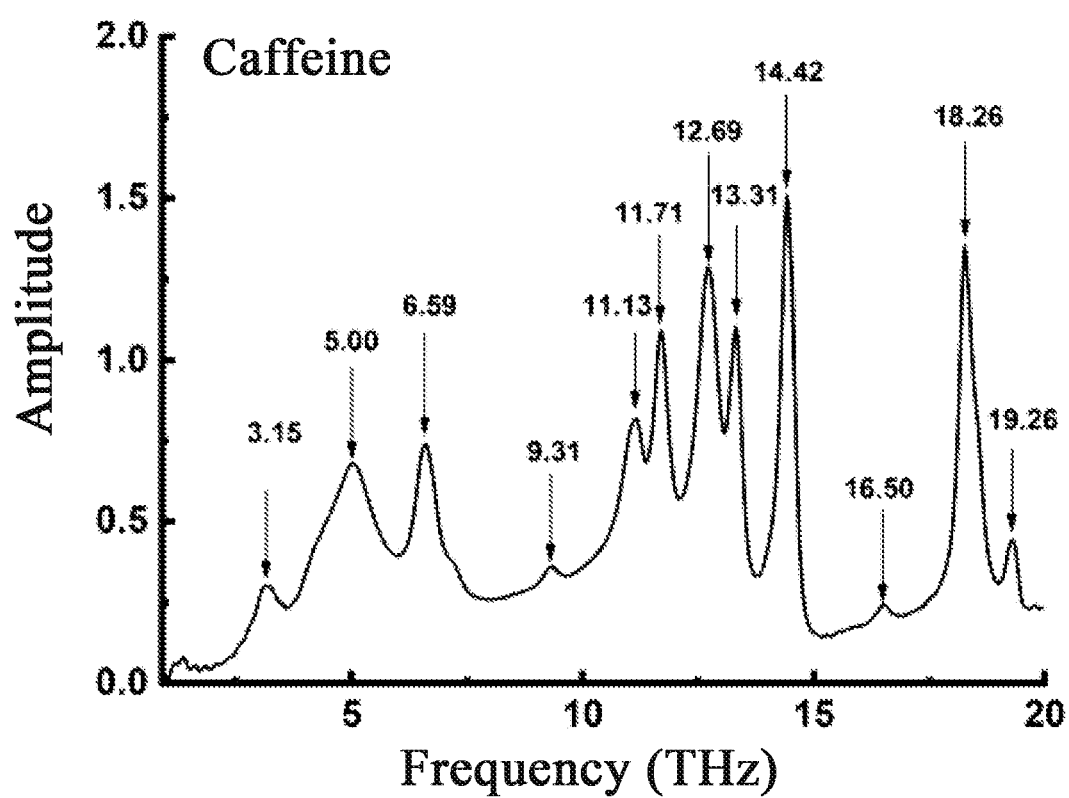
FIG. 1 is a terahertz absorption spectrum of a caffeine sample according to an embodiment of the present disclosure.

A terahertz absorption spectrum of a caffeine sample is presented in FIG. 1.

The terahertz absorption spectrum commercially available pure caffeine is obtained using the FTIR. As shown in FIG. 1, the caffeine has multiple characteristic peaks at 3.15 THz-19.26 THz.

The method for qualitative identification and quantitative determination of caffeine in a drug includes the following steps.

(1) N reference samples with different concentrations of caffeine are selected. Each of the n reference samples is scanned with the FTIR to obtain a terahertz absorption coefficient spectrum of each of the n reference samples.

In this embodiment, the prepared 35 samples with different concentrations of caffeine are used as reference samples and the caffeine is used as the target substance for qualitative and quantitative determination. Each of the 35 samples is scanned five times with the FTIR to obtain a terahertz absorption coefficient spectrum of each of the 35 samples by taking the average of five groups of data.

(2) Frequency points, amplitudes and peak areas of at least one of characteristic peak of each of the concentrations of caffeine are extracted from the corresponding terahertz absorption coefficient spectrum obtained by step 1. Concentration gradients are established between the concentrations and three characteristic quantities, respectively, where the three characteristic quantities are the frequency points, amplitudes and peak areas. The characteristic peak is one or more of the characteristic peaks in the terahertz absorption coefficient spectrum of the caffeine. Multiple characteristic peaks can be selected, which are usually sharper peaks with larger amplitudes.

In this embodiment, two characteristic peaks are selected, namely a peak at 5.00 THz and a peak at 11.71 THz. A relational graph between caffeine content in different samples and amplitudes of characteristic peaks is presented in FIG. 2. A relational graph between the caffeine content in the different samples and peak areas of the characteristic peaks is presented in FIG. 3. The characteristic peak at 5.00 THz is presented by "□", and the characteristic peak at 11.71 THz is presented by "○". An error line is marked on each of the data. A mass of caffeine in the 35 samples ranged from 1.5 mg to 12 mg with a gradient of 1.5 mg, and the abscissa is the mass of caffeine.

Figure 2:
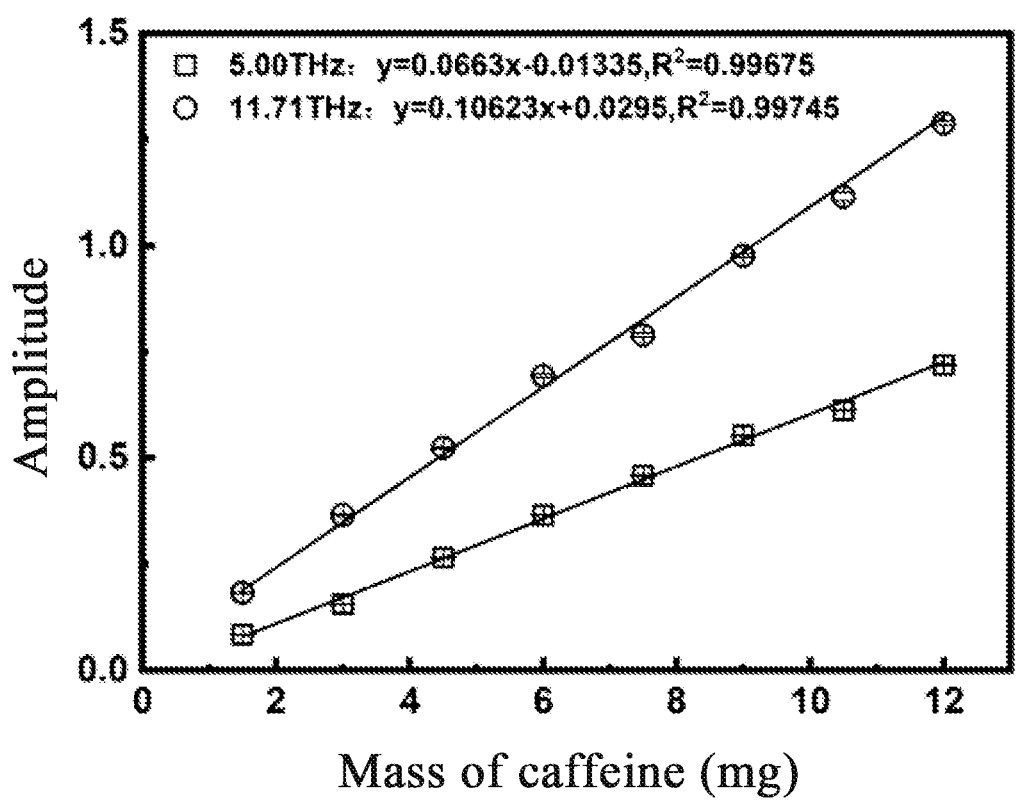
FIG. 2 is a relational graph between caffeine content in different samples and amplitudes of characteristic peaks according to an embodiment of the present disclosure.

As shown in FIG. 2, a linear fit is performed on the amplitudes of the two characteristic peaks and the mass of caffeine in the samples, respectively, according to Lambert-Beer law, where $R^2$ is a correlation coefficient between the caffeine content and increase of the amplitudes. $R^2_{5\ THz}=0.99675$, $R^2_{11.71\ THz}=0.99745$ and $R^2>0.996$, which showed that the accuracy reached more than 99.6% based on the method for detecting the concentration of the caffeine by the amplitudes of the characteristic peaks of the terahertz spectrum.

Figure 3:
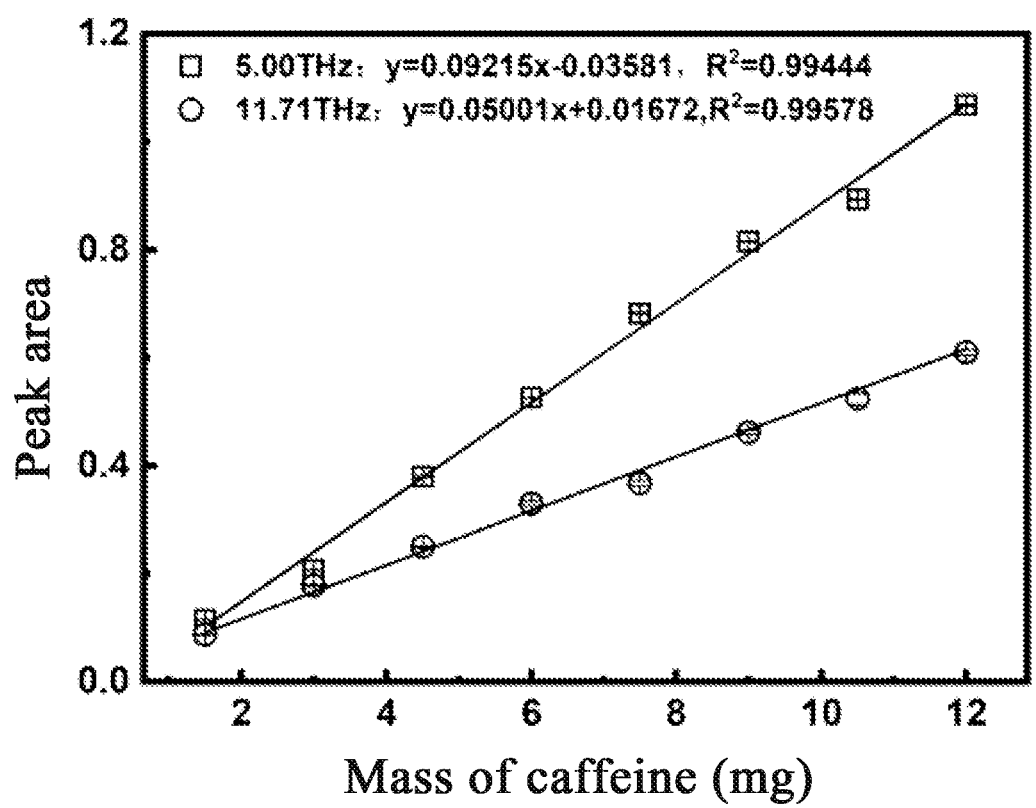
FIG. 3 is a relational graph between the caffeine content in the different samples and peak areas of the characteristic peaks according to an embodiment of the present disclosure.

As shown in FIG. 3, a linear fit is performed on the peak areas of the two characteristic peaks and the mass of caffeine in the samples, respectively, according to the Lambert-Beer law, where $R^2$ is a correlation coefficient between the caffeine content and increase of the peak areas. $R^2_{5\ THz}=0.99444$, $R^2_{11.71\ THz}=0.99578$ and $R^2>0.994$, which showed that the accuracy reached more than 99.4% based on the method for detecting the concentration of the caffeine by the peak areas of the characteristic peaks of the terahertz spectrum.

(3) The frequency points, amplitudes and peak areas obtained by step 2 as characteristic vectors are grouped into two groups, where one group is used as training data, and another group is used as test data. The training data is configured to establish training of a support vector regression (SVR) model to find out characteristic relationship between the concentrations of the caffeine and the characteristic vectors of the terahertz absorption coefficient spectra, thereby obtaining a trained SVR model.

In this embodiment, the frequency points, amplitudes and peak areas as the characteristic vectors in the 35 terahertz absorption coefficient spectra are grouped into the two groups, where 23 terahertz absorption coefficient spectra are randomly selected to obtain the frequency points, amplitudes and peak areas thereof as a training set, 12 terahertz absorption coefficient spectra are selected to obtain the frequency points, amplitudes and peak areas thereof as a test set. The data in the training set is training data is referred to as the training data, and the data in the test set is referred to as the test data.

The training data is imported in to the libsvm toolkit and is configured to train the SVR model of the caffeine. A leave-one-out cross validation method is configured to find the best kernel parameters and regularization parameters in order to make the accuracy higher. Next, the corresponding relationship between the concentrations of reference samples with caffeine and characteristics of the terahertz spectra is found by training of these parameters, thereby obtaining a parameter model of the caffeine.

(4) An analyte is scanned with the FTIR to obtain the terahertz absorption coefficient spectrum of the analyte, from which the frequency points, amplitudes and peak areas of the analyte are obtained. The frequency points, amplitudes and peak areas are imported into the trained SVR model obtained by step 3. A mathematical calculation is performed to qualitatively identify and quantitatively determine the caffeine in the analyte.

In practical applications, the analyte is scanned with the FTIR to obtain the terahertz absorption coefficient spectrum of the analyte, from which the same characteristic peaks as that in step 2 are selected to obtain the frequency points, amplitudes and peak areas of the analyte. The frequency points, amplitudes and peak areas are imported into the trained SVR model obtained by step 3 for testing.

In this embodiment, the trained SVR model is configured to test the 12 drug samples in the test set as the analytes. The results are shown in FIG. 4.

Figure 4:
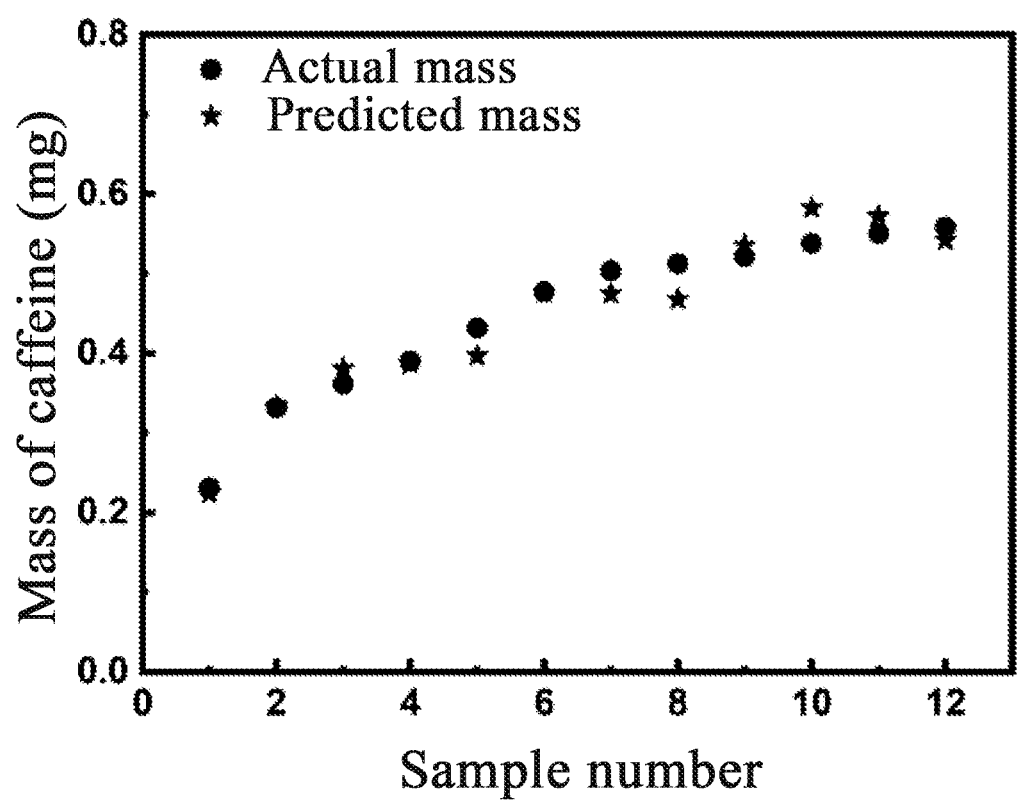
FIG. 4 is a graph showing test results of the caffeine content in 12 samples according to an embodiment of the present disclosure.

A graph showing test results of the caffeine content in 12 samples is presented in FIG. 4. Each of the samples is made of 60 mg of COC and the compound paracetamol with different qualities, where the qualities of the compound paracetamol are 4.13 mg, 6.38 mg, 7.09 mg, 7.36 mg, 8.00 mg, 9.32 mg, 9.71 mg, 10.01 mg, 9.68 mg, 10.22 mg, 10.46 mg and 10.26 mg.

As shown in FIG. 4, the predicting accuracy of caffeine in the 12 samples is 95.75%. Therefore, the corresponding data of the analytes is imported into the trained SVR model for calculation to obtain the results, which simplifies the measurement method, reduces the measurement cost, and has a wide range of applications.

In the method provided herein, terahertz absorption coefficient spectra of drugs with different concentrations of caffeine are measured, from which the frequency points, amplitudes and peak areas of characteristic peaks of the drugs with different concentrations of caffeine are obtained as characteristic quantities. Concentration gradients are established between the concentrations and the characteristic quantities, respectively. The characteristic quantities are imported to the SVR model to establish a training set and a test set. Finally, the qualitative identification and quantitative analysis of caffeine in unknown drugs are achieved. The method does not need to determine initial spectra of pure products corresponding to all ingredients in the drug. At the same time, the method is not limited to the number of the ingredients and a ratio of the ingredients in a previous test. However, the method only needs to introduce the terahertz absorption coefficient spectroscopic data of an analyte into an algorithm model to immediately obtain results. Compared to common methods, the method provided herein is more convenient and efficient, and solves problems of long time and high cost for the determination of the caffeine in the drug when a large amount of substances in the drug are mixed.

In addition, in the method, the frequency points, amplitudes and peak areas of multiple characteristic peaks are selected as the characteristic vectors train the SVR model, such that the trained SVR model is more accurate in the determination of caffeine in an unknown drug.

Described above are only preferred embodiments of this application, which are not limited the protection scope of this application.

What is claimed is:

1. A method for qualitative identification and quantitative determination of caffeine in a drug, comprising:
   (1) selecting n reference samples with different concentrations of caffeine; and scanning each of the n reference samples with a Fourier transform infrared spectrometer (FTIR) to obtain a terahertz absorption coefficient spectrum of each of the n reference samples;
   (2) extracting frequency points, amplitudes and peak areas of at least one of characteristic peak of each of the concentrations of caffeine from the corresponding terahertz absorption coefficient spectrum obtained by step 1; and establishing concentration gradients between the concentrations and three characteristic quantities, respectively, wherein the three characteristic quantities are the frequency points, amplitudes and peak areas;
   (3) grouping the frequency points, amplitudes and peak areas obtained by step 2 as characteristic vectors into two groups, wherein one group is used as training data, and another group is used as test data; and using the training data to establish training of a support vector regression (SVR) model to find out characteristic relationship between the concentrations of the caffeine and the characteristic vectors of the terahertz absorption coefficient spectra, thereby obtaining a trained SVR model; and
   (4) scanning an analyte with the FTIR to obtain the terahertz absorption coefficient spectrum of the analyte, from which the frequency points, amplitudes and peak areas of the analyte are obtained; importing the frequency points, amplitudes and peak areas into the trained SVR model obtained by step 3; and performing a mathematical calculation to qualitatively identify and quantitatively determine the caffeine in the analyte;
   wherein the characteristic peak is one or more of the characteristic peaks in the terahertz absorption coefficient spectrum of the caffeine.

* * * * *